United States Patent
Geosling

(10) Patent No.: US 8,265,444 B2
(45) Date of Patent: Sep. 11, 2012

(54) IMPLEMENTATION OF ONE OR MORE OPTICAL WAVEGUIDES IN REDUCED OPTICAL MATERIAL

(75) Inventor: Christine Geosling, Calabasas, CA (US)

(73) Assignee: Northrop Grumman Guidance and Electronics Company, Inc., Woodland Hills, CA (US)

(*) Notice: Subject to any disclaimer, the term of this patent is extended or adjusted under 35 U.S.C. 154(b) by 0 days.

(21) Appl. No.: 12/930,986

(22) Filed: Jan. 21, 2011

(65) Prior Publication Data
US 2011/0123164 A1 May 26, 2011

Related U.S. Application Data

(62) Division of application No. 11/097,600, filed on Apr. 1, 2005, now Pat. No. 7,903,920.

(60) Provisional application No. 60/558,941, filed on Apr. 2, 2004.

(51) Int. Cl.
*G02B 6/10* (2006.01)

(52) U.S. Cl. .......................................... 385/129; 438/31
(58) Field of Classification Search ................... 385/129; 438/31
See application file for complete search history.

(56) References Cited

U.S. PATENT DOCUMENTS

| | | | | |
|---|---|---|---|---|
| 4,685,763 | A * | 8/1987 | Tada et al. | 385/8 |
| 6,282,356 | B1 * | 8/2001 | Johnston et al. | 385/129 |
| 6,890,450 | B2 * | 5/2005 | Naydenkov et al. | 216/24 |

* cited by examiner

*Primary Examiner* — Charlie Peng
(74) *Attorney, Agent, or Firm* — Carmen Patti Law Group, LLC

(57) ABSTRACT

One or more first portions of a reduced optical material wafer are covered with a masking layer that leaves uncovered one or more second portions of the reduced optical material wafer. The reduced optical material wafer is exposed to an oxidizing atmosphere to reverse a reduction of the one or more second portions of the reduced optical material wafer that makes the one or more second portions receptive for implementation of one or more optical waveguides.

9 Claims, 1 Drawing Sheet

IMPLEMENTATION OF ONE OR MORE OPTICAL WAVEGUIDES IN REDUCED OPTICAL MATERIAL

CROSS-REFERENCE TO RELATED APPLICATION

This application is a divisional of U.S. application Ser. No. 11/097,600, filed on Apr. 1, 2005, now U.S. Pat. No. 7,903,920, which claims the priority of U.S. provisional Patent Application Ser. No. 60/558,941 (by Christine Geosling, filed Apr. 2, 2004, and entitled "IMPLEMENTATION OF ONE OR MORE OPTICAL WAVEGUIDES IN REDUCED OPTICAL MATERIAL").

TECHNICAL FIELD

The invention relates generally to waveguides and more particularly to production of optical waveguides.

BACKGROUND

In the fabrication of integrated optics chips from optical material wafer substrates, a proton exchange process forms low loss waveguides in the optical material wafer substrate. The optical material wafer substrate in one example comprises an optical quality lithium niobate ($LiNbO_3$) wafer. In one example, the lithium niobate wafer is immersed in a melt of benzoic acid to initiate the proton exchange process. In another example, the lithium niobate wafer is immersed a melt of 1% to 4% lithium benzoate in benzoic acid. In yet another example, the lithium niobate wafer is exposed to benzoic acid vapors at an elevated temperature to initiate the proton exchange process.

The lithium niobate wafer is masked to define a pattern of waveguide structures. A diffusion process substitutes protons for lithium ions in a lattice of the lithium niobate wafer. The lithium niobate wafer may then be diced into chips, such as multifunctional integrated optics chips ("MIOC's"). Low optical loss is achieved in the waveguides by adjusting the temperature, time, and mole fraction of lithium benzoate in the melt. For waveguides formed with melt compositions containing less than 2.6% lithium benzoate (dependent on temperature) it may be necessary to thermally anneal the waveguides after the proton exchange process to achieve low loss in the waveguides.

Crystals of optical material wafers, such as the lithium niobate wafer, are subject to a pyroelectric effect. The pyroelectric effect causes a linear change in spontaneous polorization in the lithium niobate wafer as a function of temperature. The pyroelectric effect is the result of the movement of the lithium and niobium ions relative to the oxygen layers of the lithium niobate wafer. Since the lithium and niobium ions move only in a direction parallel to the Z-axis (e.g., principal or c-axis of the crystal), a potential difference is set up between the two Z-axis faces of the crystal. Since the pyroelectric tensor of a lithium niobate crystal is negative, cooling the lithium niobate crystal causes the +Z face to become positively charged. As one shortcoming, the static charges generated by the pyroelectric effect limit the performance of integrated optical devices over temperature. For example, the static charges generated by the pyroelectric effect interfere with electrical biasing and modulation schemes of the integrated optical devices. The static charges generated by the pyroelectric effect may even cause sparking in the integrated optical devices.

In attempt to mitigate the pyroelectric effect, conductive depositions and circuits have been added to the optical material wafers, such as the lithium niobate wafer, to bleed off pyroelectric static charges from the z-axis crystalline faces, where they arise due to temperature excursions of the device. The conductive depositions and circuits may prevent sparking and decrease relaxation times of the lithium niobate wafer. However, as another shortcoming, the conductive depositions and circuits may fail to prevent the potential gradient within the crystals of the lithium niobate wafer, most importantly in the vicinity of the waveguides.

Thus, a need exists for a fabrication process of integrated optics chips that serves to mitigate the pyroelectric effect in the integrated optics chips.

SUMMARY

The invention in one embodiment encompasses a process. One or more first portions of a reduced optical material wafer are covered with a masking layer that leaves uncovered one or more second portions of the reduced optical material wafer. The reduced optical material wafer is exposed to an oxidizing atmosphere to reverse a reduction of the one or more second portions of the reduced optical material wafer that makes the one or more second portions receptive for implementation of one or more optical waveguides.

DESCRIPTION OF THE DRAWINGS

Features of exemplary implementations of the invention will become apparent from the description, the claims, and the accompanying drawings in which:

DETAILED DESCRIPTION

Figure 1:
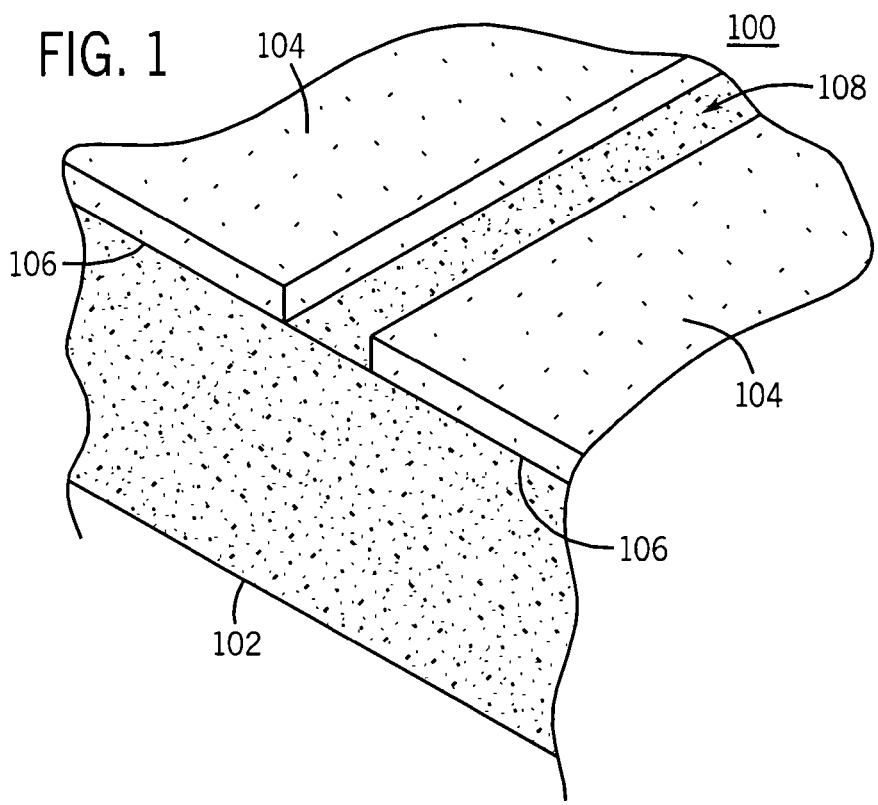
FIG. 1 is a representation of an exemplary implementation of an apparatus that comprises a reduced optical material wafer and one or more masking layers.

Turning to FIG. 1, an apparatus 100 in one example comprises a reduced optical material wafer, such as a reduced lithium niobate wafer 102, and one or more masking layers 104. The reduced lithium niobate wafer 102 in one example comprises a substrate for one or more optical waveguides formed by an annealed proton exchange ("APE") process.

To form the reduced lithium niobate wafer 102, an unreduced lithium niobate wafer in one example undergoes a reduction process that results in a modification of unreduced lithium niobate to reduced lithium niobate. The reduction process comprises a chemical reduction of the unreduced lithium niobate wafer. To create the reduced lithium niobate wafer 102, the unreduced lithium niobate wafer is put through a high temperature process in a reduced atmosphere, such as a hydrogen-argon environment, as known by those skilled in the art. The reduced lithium niobate wafer 102 in one example has a black or gray color based on the level of reduction. The more the reduced lithium niobate wafer 102 has been reduced, the darker the reduced lithium niobate wafer 102 appears.

Lithium niobate has a relatively high pyroelectric constant, which results in a pyroelectric effect in lithium niobate wafers. The high pyroelectric constant makes lithium niobate susceptible to charging in response to temperature changes. Since lithium and niobium ions of the reduced lithium niobate wafer 102 move only in a direction parallel to the Z-axis (e.g., principal or c-axis of the crystal), a potential difference is set up between the two Z-axis faces of the crystal. The reduced lithium niobate wafer 102 in one example comprises X-cut material. So, the Z-axis is transverse to the plane of the optical waveguide of the reduced lithium niobate wafer 102. The reduced lithium niobate wafer 102 is X-cut material to guide a single polarization of light. Reduced lithium niobate wafers are available in other orientations, as will be appreciated by those skilled in the art.

The pyroelectric effect can limit performance of integrated optics chips and optical waveguides with lithium niobate substrates. Crystals of the reduced lithium niobate wafer 102 in one example have greater electrical conductivity than crystals of the unreduced lithium niobate wafer. Reduced lithium niobate in one example is one to five orders of magnitude more conductive than unreduced lithium niobate. The greater electrical conductivity of the reduced lithium niobate wafer 102 makes the reduced lithium niobate wafer 102 less susceptible to pyroelectric charging compared to the unreduced lithium niobate wafer. Since the reduced lithium niobate wafer 102 has greater electrical conductivity, the reduced lithium niobate wafer 102 is able to drain off the pyroelectric charges so the pyroelectric charges don't build up over time to a point where the pyroelectric charges would limit performance of the integrated optics chips and optical waveguides with lithium niobate substrates. Reduced lithium niobate has a shorter time constant than unreduced lithium niobate for pyroelectric charges retained in the crystals. So, potential gradients equalize more quickly in reduced lithium niobate than in unreduced lithium niobate.

The increased conduction of the reduced lithium niobate mitigates pyroelectric charges and promotes an increase in performance of optical waveguides. However, crystals of reduced lithium niobate in one example have greater optical absorption than crystals of unreduced lithium niobate. Greater absorption in reduced lithium niobate may result in higher losses in the optical waveguides. For example, the reduced lithium niobate of the optical waveguide may absorb the frequency of light that the optical waveguide is attempting to propagate.

To make the reduced lithium niobate wafer 102 receptive for implementation of one or more low loss optical waveguides while retaining the beneficial increased conductivity of the reduced lithium niobate substrate, one or more portions of the reduced lithium niobate wafer 102 are exposed to an oxidizing atmosphere to reverse the reduced state of the portions of the reduced lithium niobate wafer 102. The oxidizing atmosphere returns the portions of the reduced lithium niobate wafer 102 back to an unreduced state to support low loss optical transmission through the optical waveguides. The portions of the reduced lithium niobate wafer 102 that remain in the reduced state still serve to mitigate the pyroelectric effect in the reduced lithium niobate wafer 102 while the unreduced areas are receptive for optical transmission. The masking layer 104 in one example covers one or more first portions 106 of the reduced lithium niobate wafer 102 and leaves one or more second portions 108 of the reduced lithium niobate wafer 102 uncovered. The masking layer 104 in one example comprises a metal, such as aluminum or chromium, or a dielectric, such as silicon dioxide. The masking layer 104 in one example has a thickness of about 1000 microns and is substantially impervious to oxidizing atmosphere.

The masking layer 104 in one example abuts a first side of the reduced lithium niobate wafer 102. For example, the first side of the reduced lithium niobate wafer 102 is employed for implementation of optical waveguides. A second masking layer (e.g., analogous to the masking layer 104) may be applied to a second side of the reduced lithium niobate wafer 102. The second masking layer may cover all of the second side since the second side in one example is not employed for implementation of optical waveguides. For example, the second masking layer is not patterned for exposure of specific portions of the second side to the oxidizing atmosphere.

Upon exposure of the reduced lithium niobate wafer 102 to an oxidizing atmosphere, the masking layer 104 prevents the first portions 106 of the reduced lithium niobate wafer 102 from being exposed to the oxidizing atmosphere. For example, the masking layer 104 serves to maintain a reduced state in the first portions 106 of the reduced lithium niobate wafer 102. The masking layer 104 maintains a reduced state in the first portions 106 to mitigate an overall pyroelectric effect in the reduced lithium niobate wafer 102.

The masking layer 104 is patterned to allow exposure of the second portions 108 of the reduced lithium niobate wafer 102 to the oxidizing atmosphere. The second portions 108 of the reduced lithium niobate wafer 102 are exposed to the oxidizing atmosphere to reverse a reduction of the second portions 108 of the reduced lithium niobate wafer 102 to make the second portions 108 receptive for implementation of optical waveguides. For example, after reversal of the reduction in the second portions 108, the second portions 108 have similar electro-optic properties to unreduced lithium niobate. The electro-optic properties of unreduced lithium niobate are favorable for optical transmission.

Figure 2:
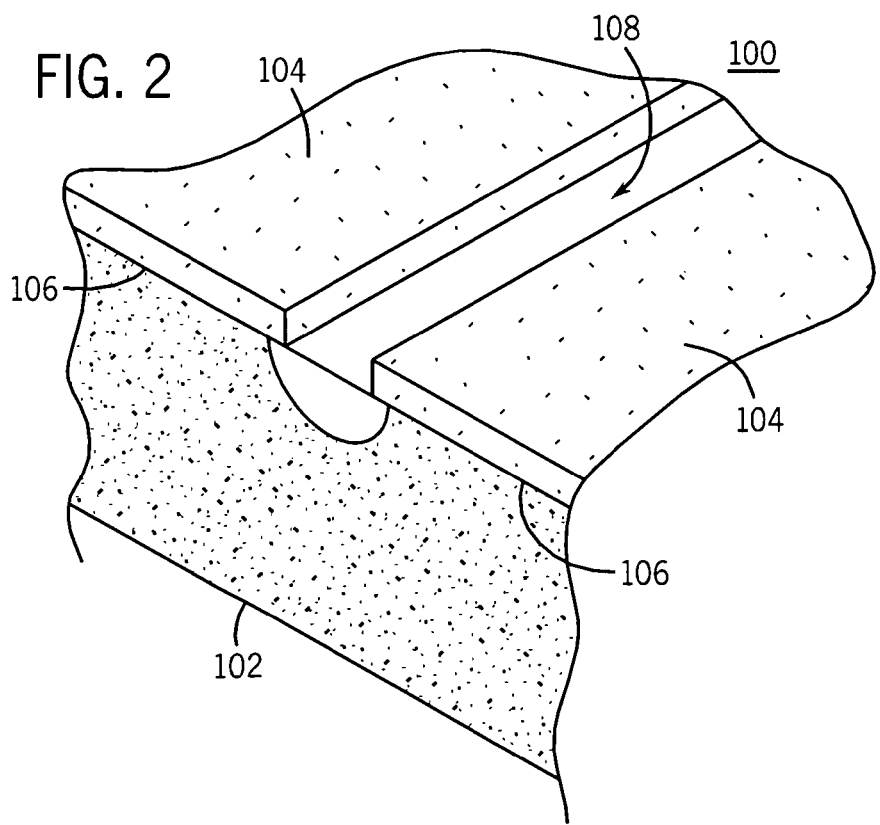
FIG. 2 is a representation of the reduced optical material wafer of the apparatus of FIG. 1 after exposure to an oxidizing atmosphere to reverse a reduction of one or more portions of the reduced optical material wafer.

Referring to FIGS. 1-2, an illustrative description of an exemplary fabrication of the apparatus 100 is now presented, for explanatory purposes. For example, user and/or machine driven processes in one example fabricate one or more optical waveguides in the second portions 108 of the reduced lithium niobate wafer 102.

In one example, the fabrication process begins with the reduced lithium niobate wafer 102 already in the reduced state. The reduced lithium niobate wafer 102 is optical grade and in the X-cut or Y-cut orientation. In another example, the fabrication process begins with an unreduced lithium niobate wafer in the unreduced state. The unreduced lithium niobate wafer then undergoes a chemical reduction. For example, a diced and ground X-cut optical grade unreduced lithium niobate wafer is selected before polishing and is subjected to the reduction process to achieve the reduced lithium niobate wafer 102, as will be appreciated by those skilled in the art.

Once the reduced lithium niobate wafer 102 achieves the reduced state, the reduced lithium niobate wafer 102 is polished to a suitable degree for fabrication of the optical waveguide in the second portion 108. The reduced lithium niobate wafer 102 is then cleaned and subjected to a masking process. The masking process includes photolithography steps to define locations for optical waveguides on the reduced lithium niobate wafer 102 for an intended application, deposition of the masking layer 104, and the removal of a photoresist from the reduced lithium niobate wafer 102. The masking layer 104 is applied to a first side of the reduced lithium niobate wafer 102.

The masking layer 104 is then in one example subjected to a lift-off process to leave uncovered the second portions 108 of the reduced lithium niobate wafer 102 to define the locations on the reduced lithium niobate wafer 102 for formation of the desired optical waveguides. A second masking layer (e.g., analogous to the masking layer 104) may be applied to a second side of the reduced lithium niobate wafer 102, as described herein. The second masking layer in one example is not patterned for formation of optical waveguides and thus protects substantially all of the second side from the oxidizing atmosphere.

Oxidation of the second portions 108 of the reduced lithium niobate wafer 102 will reverse the reduction in the second portions 108 to make the second portions 108 receptive to formation of optical waveguides. Since reduced lithium niobate re-oxidizes at elevated temperatures, the reduced lithium niobate wafer 102 is subjected to a thermal reversal process in an oxidizing atmosphere. The thermal reversal process restores the material properties of the second portions 108 of the reduced lithium niobate wafer 102 to be used for formation of the optical waveguides. For example, the second portions 108 of the reduced lithium niobate wafer 102 to be used for formation of the optical waveguides recover the electro-optic properties and crystalline phase of unreduced lithium niobate.

A temperature and a time period for the thermal reversal process are selected to cause re-diffusion and bleaching in the second portions 108 of the reduced lithium niobate wafer 102 uncovered by the masking layer 104. The first portions 106 of the reduced lithium niobate wafer 102 that maintain a reduced state are dark in color and the second portions 108 of the reduced lithium niobate wafer 102 that have reversed back to an unreduced state in one example are light in color, as shown in FIG. 2. The reversal of the reduction to the second portions 108 of the reduced lithium niobate wafer 102 uncovered by the masking layer 104 occurs to a depth at least equal to the optical waveguide depth to be achieved in a subsequent proton exchange process. The first portions 106 of the reduced lithium niobate wafer 102 that are covered by the masking 104 are protected from the oxidizing atmosphere and remain in the reduced state. Also, the areas of the reduced lithium niobate wafer 102 that are covered by the second masking layer remain in the reduced state.

Once the uncovered areas of the reduced lithium niobate wafer 102 are reversed back to an unreduced state, the reduced lithium niobate wafer 102 is subjected to a proton exchange process. The proton exchange process forms the optical waveguides in the uncovered areas of the reduced lithium niobate wafer 102, as will be appreciated by those skilled in the art.

Alternatively, the reduced lithium niobate wafer 102 may be subjected to the proton exchange process without the prior thermal reversal process of the reduced lithium niobate wafer 102 in the oxidizing atmosphere. For example, the optical waveguides may be designed to operate at a wavelength in the near infrared range or longer where the optical absorption of reduced lithium niobate has tailed off or where the optical waveguide parameters are sufficient for the intended application. The surface area of the reduced lithium niobate wafer 102 remains covered by the masking layer 104 to maintain the reduced state of the reduced lithium niobate wafer 102.

After proton exchange of the reduced lithium niobate wafer 102, the reduced lithium niobate wafer 102 is subjected to an oxygen or air anneal process at temperatures near or in excess of 350° C. The anneal process restores the electro-optic coefficients and the crystalline structure in the second portions 108 of the reduced lithium niobate wafer 102 uncovered by the masking layer 104, as will be appreciated by those skilled in the art. Since the anneal process is sufficient to oxidize reduced niobate, the masking layer 104 is left on the reduced lithium niobate wafer 102 for the anneal process. Therefore, the first portions 106 covered by the masking layer 106 remain in the reduced state.

After completion of the anneal process, the mask layer 104 may be removed from the reduced lithium niobate wafer 102 and the reduced lithium niobate wafer 102 is ready to continue the fabrication sequence to form one or more integrated optics chips, as will be appreciated by those skilled in the art. For example, electrodes are added to the reduced lithium niobate wafer 102 and the reduced lithium niobate wafer 102 is diced into one or more optical waveguide chips. For example, the optical waveguide chips comprise one or more of the low loss optical waveguides formed in a matrix of reduced lithium niobate.

The apparatus 100 in one example comprises a plurality of components such as hardware components. A number of such components can be combined or divided in one example of the apparatus 100. The apparatus 100 in one example comprises any (e.g., horizontal, oblique, or vertical) orientation, with the description and figures herein illustrating one exemplary orientation of the apparatus 100, for explanatory purposes.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An optical material wafer, comprising:
   one or more pyroelectric charge drain portions;
   one or more waveguide portions receptive for implementation of one or more optical waveguides; and
   wherein the one or more pyroelectric charge drain portions comprise a reduced optical material, wherein the one or more waveguide portions comprise the reduced optical material re-oxidized to reverse a reduction of the reduced optical material in the one or more waveguide portions, and wherein the reduced optical material in the one or more pyroelectric charge drain portions has a greater electrical conductivity than the re-oxidized optical material in the one or more waveguide portions.

2. The optical material wafer of claim 1, wherein the reduced optical material comprises lithium niobate that was exposed to a reduced atmosphere.

3. The optical material wafer of claim 1, wherein the reduced optical material in the one or more pyroelectric charge drain portions has a greater electrical conductivity than the re-oxidized optical material in the one or more waveguide portions.

4. An optical material wafer, comprising:
   one or more pyroelectric charge drain portions;
   one or more waveguide portions receptive for implementation of one or more optical waveguides; and
   wherein the one or more pyroelectric charge drain portions comprise a reduced optical material, wherein the one or more waveguide portions comprise the reduced optical material re-oxidized to reverse a reduction of the reduced optical material in the one or more waveguide portions, wherein the re-oxidized optical material in the one or more waveguide portions has a lower optical absorption than the reduced optical material in the one or more pyroelectric charge drain portions.

5. A product, comprising:
   a reduced optical material wafer, including an re-oxidized portion, having an upper surface of the wafer including both a first reduced portion and the re-oxidized portion, whereby properties of the re-oxidized portion are fabricated by exposing the uncovered portion to an oxidizing atmosphere to reverse a previous reduction of the uncovered portion.

6. The product of claim 5, the product further comprising: a masking layer applied to the first portion preventing a reversal of a reduction of the first portion upon exposure to the oxidizing atmosphere.

7. The product of claim 6, wherein the preventing of the reversal of the reduction of the covered portion upon exposure to the oxidizing atmosphere further comprises, maintaining a reduced state in the first portion to migrate a pyroelectric effect in the reduced optical material wafer.

8. An optical material wafer, comprising:
one or more pyroelectric charge drain portions;
one or more waveguide portions receptive for implementation of one or more optical waveguides; and
wherein the one or more pyroelectric charge drain portions comprise a reduced optical material, wherein the one or more waveguide portions comprise a re-oxidized optical material fabricated using the reduced optical material re-oxidized to reverse a previous reduction of the reduced optical material in the one or more waveguide portions within a selected second portion of the wafer, and wherein the selected second portion does not include the one or more pyroelectric charge drain portions.

9. The optical material wafer of claim 8, wherein the reduced optical material comprises lithium niobate that was exposed to a reduced atmosphere.

* * * * *